(12) United States Patent
Eleftheriou et al.

(10) Patent No.: US 8,956,108 B2
(45) Date of Patent: Feb. 17, 2015

(54) GEARED FAN ASSEMBLY

(75) Inventors: Andreas Eleftheriou, Woodbridge (CA); David Menheere, Georgetown (CA)

(73) Assignee: Pratt & Whitney Canada Corp, Longueuil, Quebec ( * ) Notice: Subject to any disclaimer, the term of this patent is extended or adjusted under 35 U.S.C. 154(b) by 460 days.

(21) Appl. No.: 13/469,712

(22) Filed: May 11, 2012

(65) Prior Publication Data
US 2013/0298522 A1 Nov. 14, 2013

(51) Int. Cl.
*F01D 15/12* (2006.01)

(52) U.S. Cl.
USPC ........................................... 415/122.1

(58) Field of Classification Search
CPC ....................................... F02C 3/06
USPC ........................ 415/122.1, 124.1; 29/888.02
See application file for complete search history.

(56) References Cited

U.S. PATENT DOCUMENTS

| | | | |
|---|---|---|---|
| 2,472,878 A * | 6/1949 | Baumann | 415/69 |
| 3,729,957 A * | 5/1973 | Petrie et al. | 60/226.1 |
| 4,969,325 A | 11/1990 | Adamson et al. | |
| 7,055,303 B2 | 6/2006 | Macfarlane et al. | |
| 7,370,467 B2 | 5/2008 | Eleftheriou et al. | |
| 7,493,754 B2 * | 2/2009 | Moniz et al. | 60/268 |
| 7,526,913 B2 * | 5/2009 | Orlando et al. | 60/268 |
| 7,694,505 B2 | 4/2010 | Schilling | |
| 7,752,836 B2 | 7/2010 | Orlando et al. | |
| 7,758,302 B2 * | 7/2010 | Linet et al. | 415/68 |
| 7,841,165 B2 | 11/2010 | Orlando et al. | |
| 7,942,079 B2 * | 5/2011 | Russ | 74/664 |
| 7,966,806 B2 * | 6/2011 | Henry et al. | 60/226.1 |
| 2008/0120839 A1 * | 5/2008 | Schilling | 29/888.02 |
| 2009/0074565 A1 * | 3/2009 | Suciu et al. | 415/122.1 |
| 2009/0293445 A1 | 12/2009 | Ress, Jr. | |
| 2013/0247539 A1 * | 9/2013 | Hoppe | 60/39.15 |

* cited by examiner

*Primary Examiner* — Liam McDowell
(74) *Attorney, Agent, or Firm* — Norton Rose Fulbright Canada

(57) ABSTRACT

An assembly for a gas turbine engine, with a gearbox including a first portion having a first input gear coupled to a rotatable turbine shaft, a first output gear, and defining a first transmission path between the first input and output gears, and a second portion having a second input gear coupled to the turbine shaft, a second output gear, and defining a second transmission path between the second input and output gears different from the first transmission path. A fan rotor is coupled to the first output gear and a booster rotor is coupled to the second output gear on a same side of the gearbox than the coupling between the fan rotor and the first output gear. A method of assembling a drive for a fan rotor and a booster rotor in a gas turbine engine is also disclosed.

20 Claims, 5 Drawing Sheets

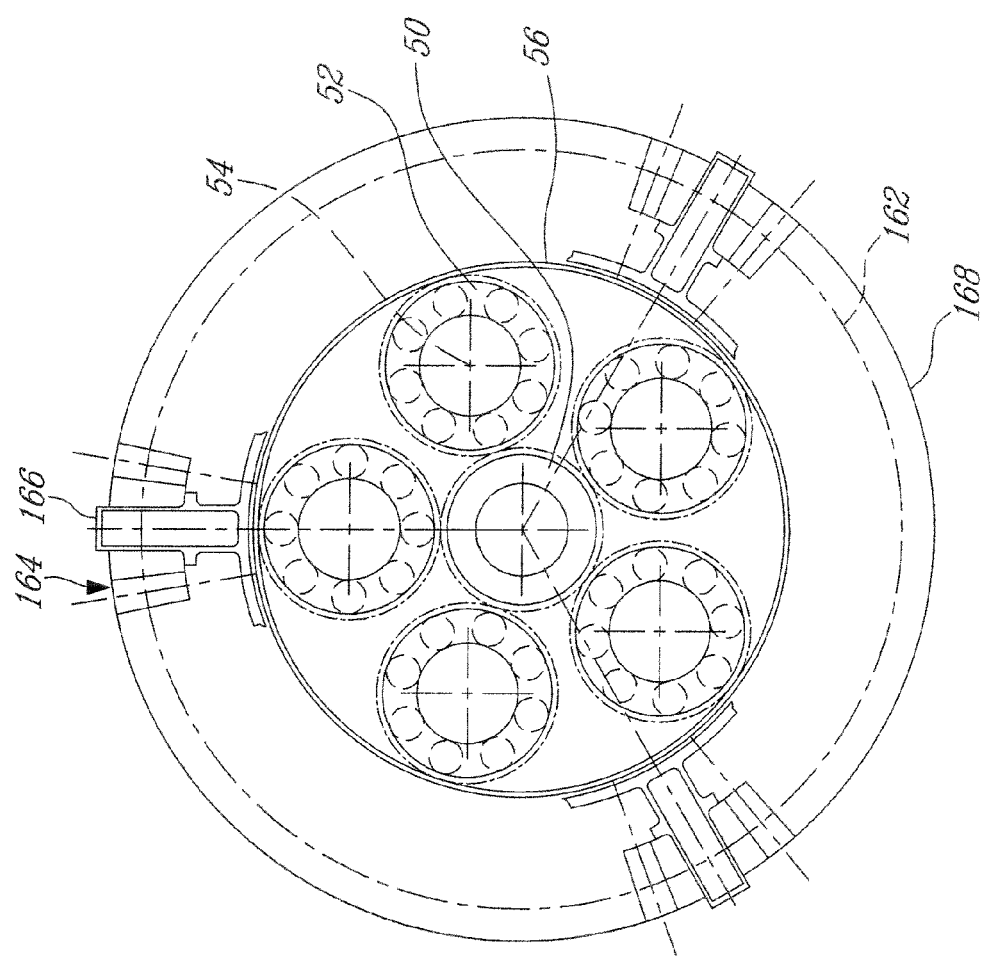

GEARED FAN ASSEMBLY

TECHNICAL FIELD

The application relates generally to gas turbine engines and, more particularly, to the drive of fan and booster rotors in such engines.

BACKGROUND OF THE ART

Turbofan engines often include a reduction gearbox connecting the low pressure turbine shaft and the fan rotor, and one or more high speed booster rotor(s) between the fan reduction gearbox and the high pressure compressor. The booster rotor(s) are usually driven directly by the low pressure turbine shaft. Typically, two structural cases are provided in order to transfer the low pressure and high pressure loads to the engine mounts. Also, the presence of the booster rotor(s) between the fan reduction gearbox and the high pressure compressor usually requires the use of two separate oil bearing cavities for the fan gearbox and for the high pressure shaft bearings.

SUMMARY

In one aspect, there is provided an assembly for a gas turbine engine, the assembly comprising: a gearbox including: a first portion having a first input gear coupled to a rotatable turbine shaft, a first output gear, and defining a first transmission path between the first input and output gears, and a second portion having a second input gear coupled to the rotatable turbine shaft, a second output gear, and defining a second transmission path between the second input and output gears different from the first transmission path; a fan rotor coupled to the first output gear; and a booster rotor coupled to the second output gear on a same side of the gearbox than the coupling between the fan rotor and the first output gear.

In another aspect, there is provided a gas turbine engine comprising: a core turbine engine; a low pressure turbine rotor located downstream of the core turbine engine and in fluid communication therewith; a rotatable low pressure shaft drivingly engaged to the low pressure turbine rotor; a gearbox including: a first portion having a first input gear coupled to the low pressure shaft, a first output gear, and defining a first transmission path between the first input and output gears, and a second portion having a second input gear coupled to the low pressure shaft, a second output gear, and defining a second transmission path between the second input and output gears different from the first transmission path; a fan rotor upstream of the core engine and coupled to the first output gear; and a booster rotor between the fan rotor and the core engine and coupled to the second output gear on a same side of the gearbox than the coupling between the fan rotor and the first output gear.

In a further aspect, there is provided a method of assembling a drive for a fan rotor and a booster rotor in a gas turbine engine, the method comprising: connecting two input gears with a low pressure shaft of the gas turbine engine; defining independent transmission path between each of the input gears and a respective one of two output gears of a same gearbox; connecting the fan rotor with one of the output gears on one side of the gearbox; and connecting the booster rotor with the other of the output gears on the one side of the gearbox.

DESCRIPTION OF THE DRAWINGS

Reference is now made to the accompanying figures in which:

FIG. 5 is a schematic front cross-sectional view of a gearbox of the fan assembly of FIG. 4.

DETAILED DESCRIPTION

Figure 1:
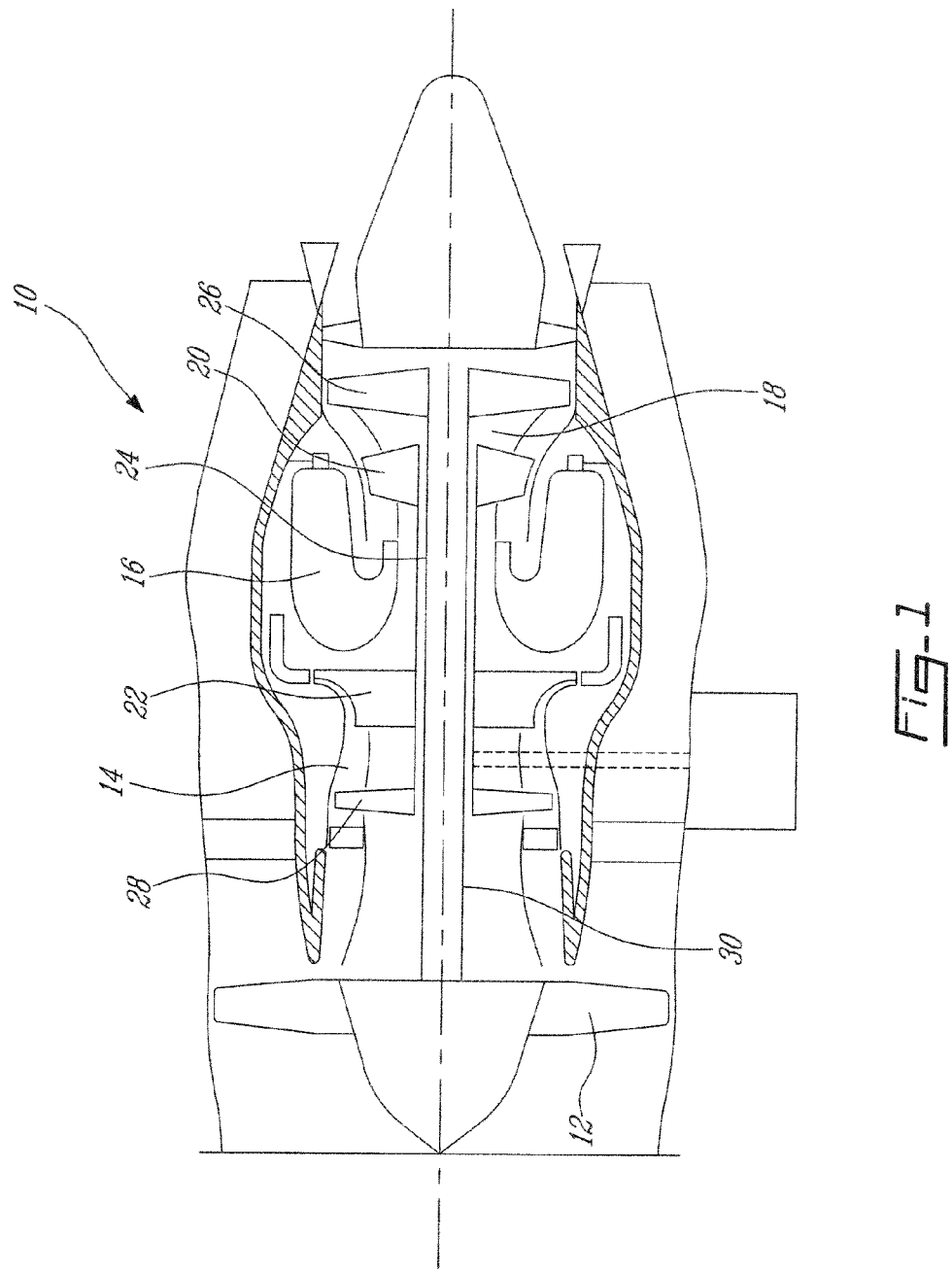
FIG. 1 is a schematic side cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) 28 of the compressor section 14 through a low pressure shaft 30 extending within the high pressure shaft 24 and rotating independently therefrom.

Figure 2:
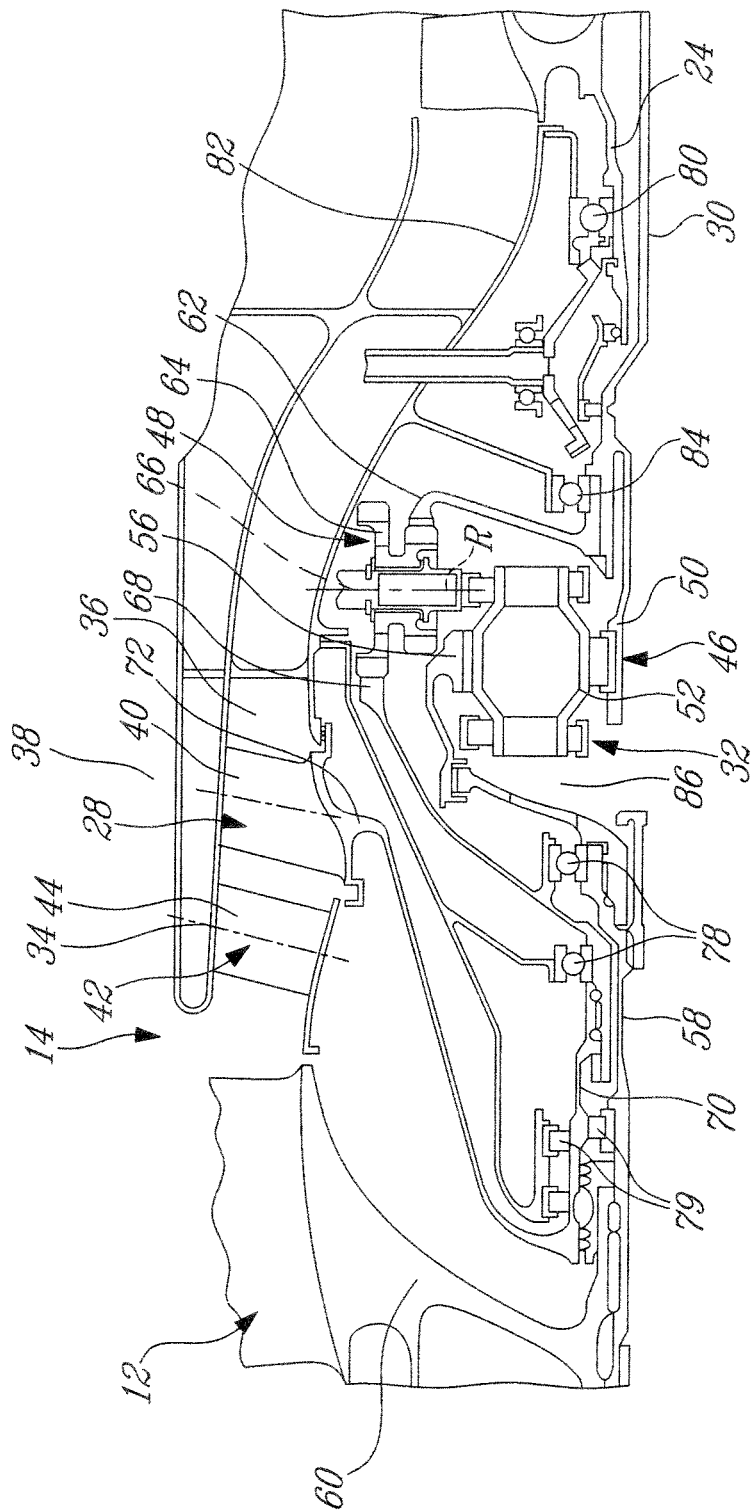
FIG. 2 is a schematic side cross-sectional view of part of a fan assembly according to one embodiment, which can be used in a gas turbine engine such as shown in FIG. 1.

Referring to FIG. 2, the fan rotor 12 and other low pressure rotor(s) 28 of the compressor section 14 are rotated by the low pressure shaft 30 through a gearbox 32. An airflow splitter 34 separates the main flowpath 36 and the bypass flowpath 38 downstream of the fan rotor 12. In the embodiment shown, the other low pressure compressor rotor(s) include a single booster rotor 28 having blades 40 extending across the main flowpath 36, downstream of the vanes 44 of a stator 42 extending across the main flowpath 36 near the upstream end of the airflow splitter 34. The booster rotor 28 is located upstream of the gearbox 32. The main flowpath 36 flares radially outwardly around the gearbox 32 due to its relatively large size, and in a particular embodiment, the booster rotor 28 is a mixed flow rotor to take advantage of the shape of the flowpath 36. Alternately, the booster rotor 28 may be an axial flow rotor and/or more than one booster rotor may be provided.

The gearbox 32 includes two portions 46, 48 each having an input gear 50, 62 coupled to the low pressure shaft 30 and defining independent transmission paths to their respective output gear 56, 68. One output gear 56 is coupled to the fan rotor 12 while the other output gear 68 is coupled to the booster rotor 28. In the embodiment shown, the fan portion 46 of the gearbox 32 includes a planetary gear system, while the booster portion 48 of the gearbox 32 includes a face gear system.

Figure 3:
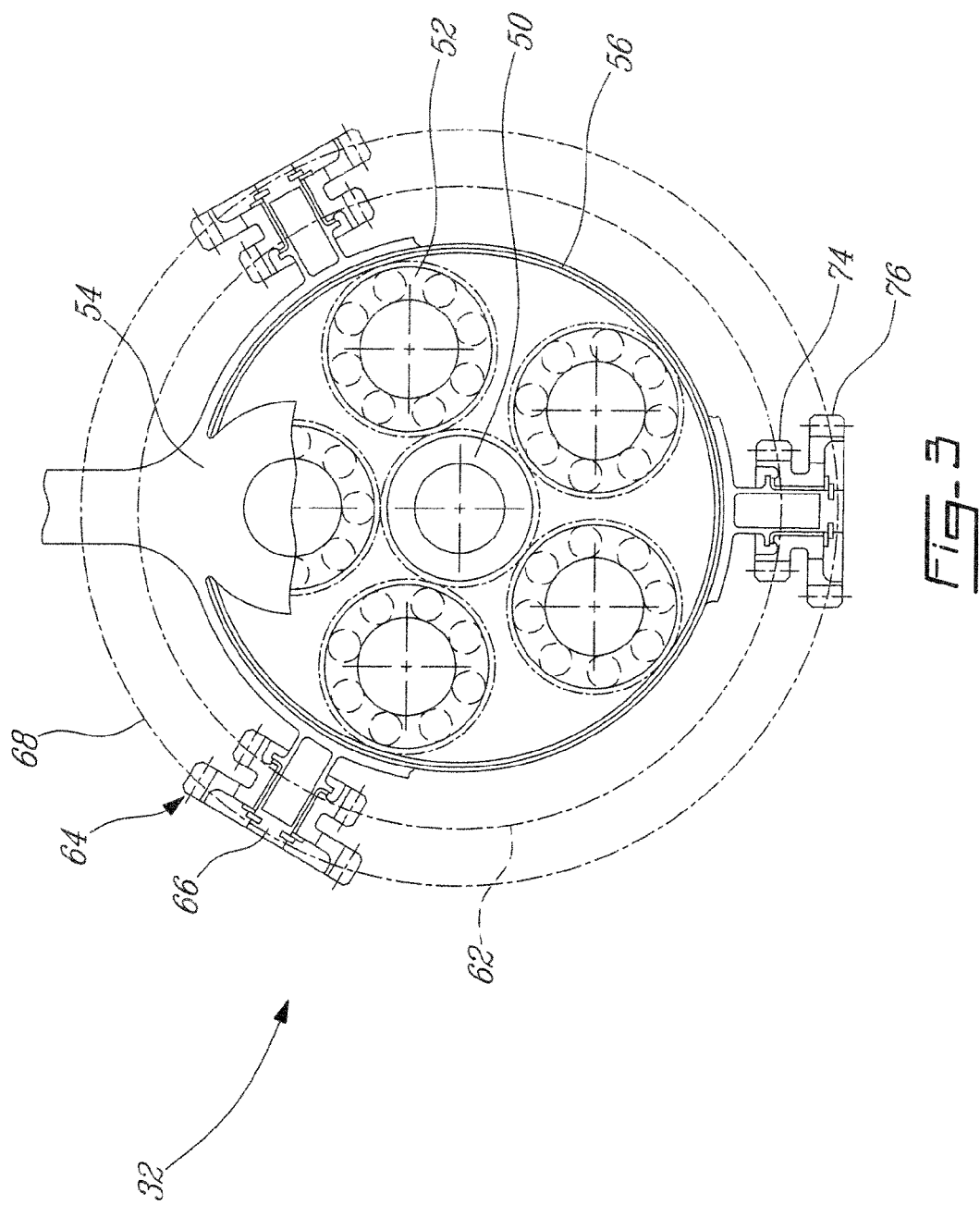
FIG. 3 is a schematic front cross-sectional view of a gearbox of the fan assembly of FIG. 2.

Referring to FIGS. 2-3, the fan portion 46 of the gearbox 32 includes an input sun gear 50 which is coupled to the low pressure shaft 30. The sun gear 50 is meshed with a plurality of planet gears 52 (five in the embodiment shown, but the number may vary) which are rotationally retained by a fixed carrier 54, for example through a respective bearing assembly. The output gear is a ring gear 56 which surrounds the planet gears 52 and is meshed therewith. The ring gear 56 is coupled to a fan shaft 58 extending coaxially with the low and high pressure shafts 30, 24, and coupled to the disc 60 of the fan rotor 12. In the embodiment shown, the coupling between the fan shaft 58 and the ring gear 56, the coupling between the fan shaft 58 and the fan rotor disc 60, and the coupling between the sun gear 50 and the low pressure shaft 30 are provided by spline connections, but other types of connections are also possible.

Still referring to FIGS. 2-3, the booster portion 48 of the gearbox 32 includes an input gear 62, which is an annular face gear, coupled to the low pressure shaft 30. The input face gear 62 is meshed with a plurality of circumferentially spaced pinion gears 64 (three in the embodiment shown, but the number may vary) which are rotationally retained by a fixed support structure 66 such as to be rotatable about their respective radially extending axis of rotation R. In the embodiment shown in FIG. 3, the fixed support structure 66 and the carrier 54 are interconnected or part of a same structure. Other configurations are also possible.

The output gear 68 is an annular face gear which is also meshed with the pinion gears 64. The output face gear 68 is coupled to an annular booster shaft 70 coaxial with and surrounding the fan shaft 58 and rotatable independently therefrom. The booster shaft 70 is coupled to the disc 72 of the booster rotor 28. In the embodiment shown, the coupling between the booster shaft 70 and the output face gear 68, the coupling between the booster shaft 70 and the booster rotor disc 72, and the coupling between the input face gear 62 and the low pressure shaft 30 are provided by spline connections, but other types of connections are also possible.

The pinion gears 64 each have two distinct constant diameter sections 74, 76 with different diameters from one another, with the input and output face gears 62, 68 being meshed with a different one of the sections. In the embodiment shown, the input face gear 62 is meshed with the smallest section 74.

In a particular embodiment, the two transmission portions 46, 48 are sized such that the rotational speed of the booster rotor 28 is greater than that of the fan rotor 12, with the fan rotor 12 rotating slower than the low pressure shaft 30 and the booster rotor 28 rotating faster than or at a same speed as the low pressure shaft 30. For example, in one embodiment, the transmission ratio for the fan portion 46 of the gearbox 32 may be from 1.8:1 to 2.4:1, and the transmission ratio for the booster portion 48 of the gearbox 32 may be from 1:1 to 1:1.8. In a particular embodiment, the transmission ratio for the fan portion 46 of the gearbox 32 is about 2.2:1, and the transmission ratio for the booster portion 48 of the gearbox is about 1:1.4.

It can be seen from FIG. 2 that the coupling between the booster shaft 70 and the output face gear 68 and the coupling between the fan shaft 58 and the ring gear 56 are located on the same side of the gearbox 32; both shafts 58, 70 extend upstream of the gearbox. Also, both shafts 58, 70 are supported by bearing assemblies 78, 79 which are located between the gearbox 32 and the booster rotor disc 72. On the other side of the gearbox 32, the front end of the high pressure shaft 24 is supported by a high pressure bearing assembly 80 engaging the engine structure 82, and the front end of the low pressure shaft 30 is supported by a low pressure bearing assembly 84 engaging the engine structure 82. The gearbox 32 and bearing assemblies 78, 79, 80, 84 are located in a same oil cavity 86, which may simplify lubrication of these components. In a particular embodiment, the use of a single oil cavity allows for a same engine structure 82 provided as a single structural case to be used to transfer the low pressure and high pressure loads to the engine mounts.

Figure 4:
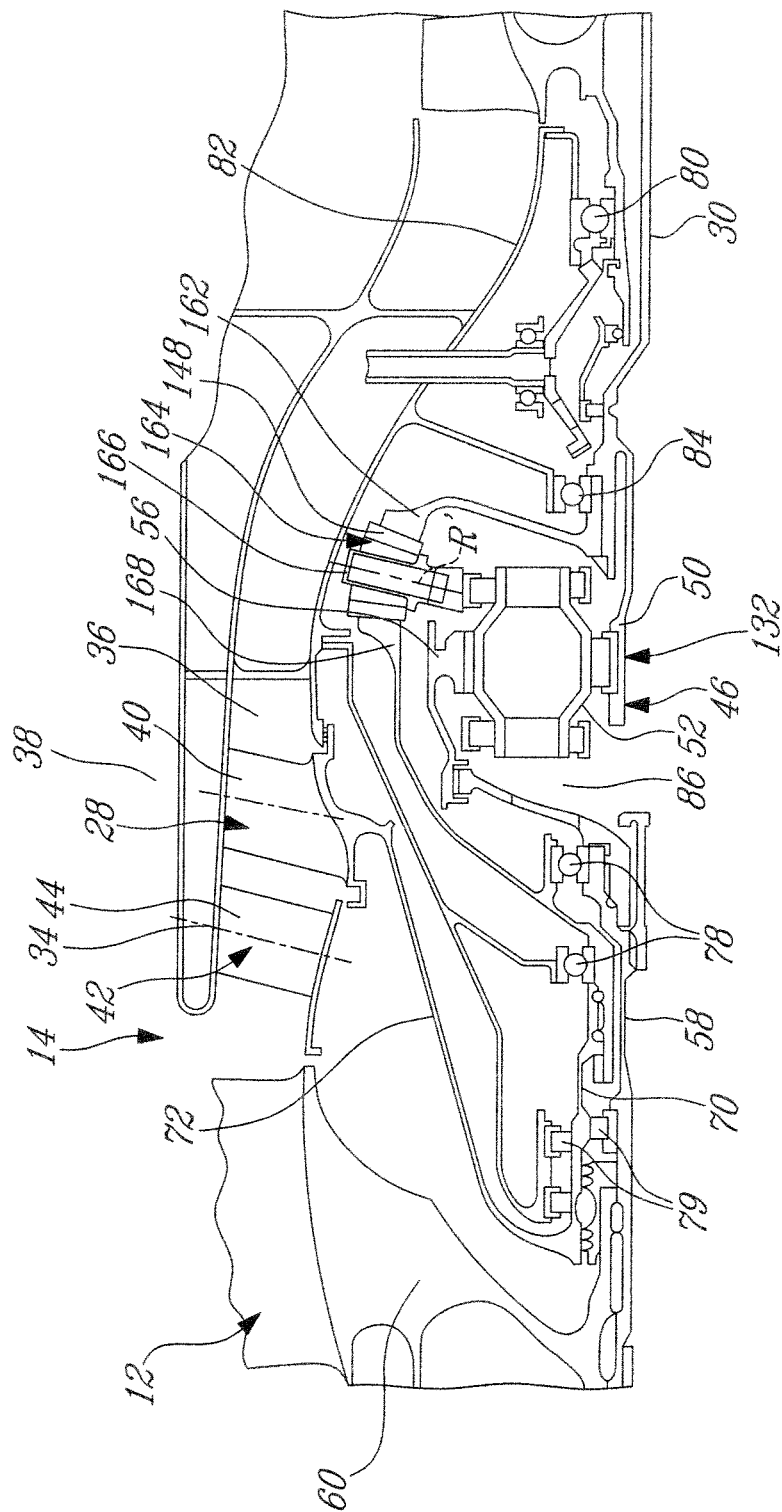
FIG. 4 is a schematic side cross-sectional view of part of a fan assembly according to another embodiment.

Referring to FIGS. 4-5, a gearbox 132 according to an alternate embodiment is shown. Identical elements are identified by the same reference numerals as the corresponding elements in the previously described embodiment and will not be further described herein.

The booster portion 148 of the gearbox 132, the pinion gears 164 meshed with the input and output bevel gears 162, 168 are rotationally retained by a fixed support structure 166 such as to be rotatable about their respective axis of rotation R' which is angled with respect to the radial direction; the outer end of each pinion gear 164 is located axially downstream of its inner end. The pinion gears 164 are bevelled, with their largest diameter being defined at the outer end. The teeth on the annular face of the input and output bevel gears 162, 168 are correspondingly angled to mesh with the bevelled and angled pinion gears 164. The variation in diameter of the pinion gears 164 is thus provided by their bevelled profile.

The geometry of the two gearbox portions may be different from that of the embodiments shown.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An assembly for a gas turbine engine, the assembly comprising:
   a gearbox including:
      a first portion having a first input gear coupled to a rotatable turbine shaft, a first output gear, and defining a first transmission path between the first input and output gears, and
      a second portion having a second input gear coupled to the rotatable turbine shaft, a second output gear, and defining a second transmission path between the second input and output gears different from the first transmission path;
   a fan rotor coupled to the first output gear; and
   a booster rotor coupled to the second output gear on a same side of the gearbox than the coupling between the fan rotor and the first output gear.

2. The assembly as defined in claim 1, wherein the first input gear is a sun gear, the first output gear is a ring gear, and the first transmission path is defined by a plurality of planet gears meshed with the sun and ring gears and retained by a fixed carrier.

3. The assembly as defined in claim 1, wherein the second input gear is an input face gear, the second output gear is an output face gear, and the second transmission path is defined by a plurality of circumferentially spaced pinions meshed with the input and output face gears and retained by a fixed support structure.

4. The assembly as defined in claim 3, wherein each pinion has a first diameter portion meshed with the input face gear and a second diameter portion meshed with the output face gear.

5. The assembly as defined in claim 1, wherein the second input gear is an input bevel gear, the second output gear is an output bevel gear, and the second transmission path is defined by a plurality of circumferentially spaced bevelled pinions meshed with the input and output bevel gears and retained by a fixed support structure.

6. The assembly as defined in claim 1, wherein the booster rotor is a mixed flow rotor.

7. The assembly as defined in claim 1, wherein bearings supporting the booster rotor, the fan rotor and an adjacent end of the turbine shaft are located in a same oil cavity as the gearbox.

8. The assembly as defined in claim 1, wherein the first and second transmission paths respectively define first and second transmission ratios determining a rotational speed of the second output gear which is greater than that of the first output gear.

9. The assembly as defined in claim 8, wherein the first transmission ratio has a value from 1.8:1 to 2.4:1 and the second transmission ratio has a value from 1:1 to 1:1.8.

10. The assembly as defined in claim 1, wherein the first input gear is a sun gear, the first output gear is a ring gear, the first transmission path is defined by a plurality of planet gears meshed with the sun and ring gears and retained by a fixed carrier, and the second transmission path is defined by a plurality of circumferentially spaced pinions meshed with the second input gear and with the second output gears and retained by a fixed support structure, the second output gear being annular and surrounding at least part of the first output gear.

11. A gas turbine engine comprising:
a core turbine engine;
a low pressure turbine rotor located downstream of the core turbine engine and in fluid communication therewith;
a rotatable low pressure shaft drivingly engaged to the low pressure turbine rotor;
a gearbox including:
  a first portion having a first input gear coupled to the low pressure shaft, a first output gear, and defining a first transmission path between the first input and output gears, and
  a second portion having a second input gear coupled to the low pressure shaft, a second output gear, and defining a second transmission path between the second input and output gears different from the first transmission path;
a fan rotor upstream of the core engine and coupled to the first output gear; and
a booster rotor between the fan rotor and the core engine and coupled to the second output gear on a same side of the gearbox than the coupling between the fan rotor and the first output gear.

12. The engine as defined in claim 11, wherein the first portion includes a planetary gear system.

13. The engine as defined in claim 11, wherein the second transmission path is defined by a plurality of circumferentially spaced pinions meshed with the second input gear and with the second output gear and retained by a fixed support structure.

14. The engine as defined in claim 13, wherein each pinion has a first diameter portion meshed with the input face gear and a second diameter portion meshed with the output face gear.

15. The engine as defined in claim 11, wherein the booster rotor is a mixed flow rotor.

16. The engine as defined in claim 11, wherein the first and second transmission paths respectively define first and second transmission ratios, the first transmission ratio having a value from 1.8:1 to 2.4:1 and the second transmission ratio having a value from 1:1 to 1:1.8.

17. The engine as defined in claim 11, wherein the first portion includes a planetary gear system, the second transmission path is defined by a plurality of circumferentially spaced pinions meshed with the second input gear and with the second output gears and retained by a fixed support structure, and the second output gear is annular and surrounds at least part of the first output gear.

18. The engine as defined in claim 11, wherein the gearbox and bearings supporting the booster rotor, the fan rotor and an adjacent end of the low pressure shaft are located in a same oil cavity.

19. A method of assembling a drive for a fan rotor and a booster rotor in a gas turbine engine, the method comprising:
connecting two input gears with a low pressure shaft of the gas turbine engine;
defining independent transmission path between each of the input gears and a respective one of two output gears of a same gearbox;
connecting the fan rotor with one of the output gears on one side of the gearbox; and
connecting the booster rotor with the other of the output gears on the one side of the gearbox.

20. The method as defined in claim 19, further comprising inserting the gearbox in a same oil cavity containing bearings supporting the low pressure shaft, the fan rotor and the booster rotor.

* * * * *